United States Patent
Lee et al.

(10) Patent No.: US 11,177,557 B2
(45) Date of Patent: Nov. 16, 2021

(54) ELECTRONIC DEVICE COMPRISING COMMUNICATION DEVICE INCLUDING SENSING ELECTRODE

(71) Applicant: Samsung Electronics Co., Ltd., Suwon-si (KR)

(72) Inventors: Jongpil Lee, Suwon-si (KR); Chanyoul Park, Suwon-si (KR); Jaegon Ghim, Suwon-si (KR); Kyungwan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/766,130

(22) PCT Filed: Nov. 23, 2018

(86) PCT No.: PCT/KR2018/014482
§ 371 (c)(1),
(2) Date: May 21, 2020

(87) PCT Pub. No.: WO2019/103505
PCT Pub. Date: May 31, 2019

(65) Prior Publication Data
US 2020/0365969 A1   Nov. 19, 2020

(30) Foreign Application Priority Data
Nov. 24, 2017   (KR) ........................ 10-2017-0158909

(51) Int. Cl.
*H01Q 1/24* (2006.01)
*G06F 3/044* (2006.01)
(Continued)

(52) U.S. Cl.
CPC ............... *H01Q 1/24* (2013.01); *G06F 3/044* (2013.01); *H01Q 9/0407* (2013.01); *H01Q 9/16* (2013.01); *H01Q 21/06* (2013.01)

(58) Field of Classification Search
CPC .......... H01Q 1/24; H01Q 9/0407; H01Q 9/16; H01Q 21/06; G06F 3/044
(Continued)

(56) References Cited

U.S. PATENT DOCUMENTS

| 9,742,056 B2 | 8/2017 | Lagnado et al. |
| 2014/0361979 A1 | 12/2014 | Woo |

(Continued)

FOREIGN PATENT DOCUMENTS

| JP | 2017-120943 A | 7/2017 |
| KR | 10-2008-0073138 A | 8/2008 |

(Continued)

OTHER PUBLICATIONS

Extended European Search Report dated Nov. 18, 2020, issued in European Application No. 18881109.5.

*Primary Examiner* — Lee Nguyen
(74) *Attorney, Agent, or Firm* — Jefferson IP Law, LLP

(57) ABSTRACT

An electronic device according to various embodiments of the present disclosure can comprise: a housing including a first plate, a second plate oriented in the direction opposite to that of the first plate, and a side member surrounding the space between the first plate and the second plate; a plurality of insulating layers interposed between the first plate and the second plate; a printed circuit board in parallel to the second plate; an array of first conductive plates mounted on one layer of the printed circuit board; a second conductive plate mounted on one layer of the printed circuit board so as not to overlap the array when viewing from the top of the second plate; a wireless communication circuit electrically con-
(Continued)

nected to the array and set to provide wireless communication at a frequency of 20-100 GHz; and a grip sensing circuit electrically connected to the second conductive plate. Other various embodiments can be possible.

20 Claims, 14 Drawing Sheets

(51) Int. Cl.
    *H01Q 9/04*     (2006.01)
    *H01Q 9/16*     (2006.01)
    *H01Q 21/06*     (2006.01)

(58) Field of Classification Search
    USPC .................................................... 455/575.7
    See application file for complete search history.

(56) References Cited

U.S. PATENT DOCUMENTS

| | | | |
|---|---|---|---|
| 2017/0047638 A1 | 2/2017 | Kim et al. | |
| 2017/0164300 A1 | 6/2017 | Lee et al. | |
| 2017/0285844 A1 | 10/2017 | Park et al. | |
| 2018/0351237 A1* | 12/2018 | Muhn | H01Q 1/245 |
| 2019/0386380 A1* | 12/2019 | Ham | H04B 1/3888 |

FOREIGN PATENT DOCUMENTS

| | | |
|---|---|---|
| KR | 10-2017-0020004 A | 2/2017 |
| KR | 10-2017-0060818 A | 6/2017 |
| KR | 10-2017-0067548 A | 6/2017 |
| KR | 10-2017-0112494 A | 10/2017 |

\* cited by examiner

ELECTRONIC DEVICE COMPRISING COMMUNICATION DEVICE INCLUDING SENSING ELECTRODE

CROSS-REFERENCE TO RELATED APPLICATION(S)

This application is a U.S. National Stage application under 35 U.S.C. § 371 of an International application number PCT/KR2018/014482, filed on Nov. 23, 2018, which is based on and claimed priority of a Korean patent application number 10-2017-0158909, filed on Nov. 24, 2017, in the Korean Intellectual Property Office, the disclosure of which is incorporated by reference herein in its entirety.

TECHNICAL FIELD

Various embodiments of the disclosure relate to an electronic device including a communication device including a sensing electrode for sensing a grip.

BACKGROUND ART

Wireless communication systems are developing in the direction of supporting a higher data transfer rate in order to satisfy the increasing demand for wireless data traffic.

$4^{th}$ generation wireless communication technology (4G network) to date has aimed at developing in the direction of enhancing spectral efficiency in order to increase the data transfer rate. Since it is difficult to ensure a wide frequency band in a frequency band (<5 GHz) currently used in the $4^{th}$ generation wireless communication technology, $5^{th}$ generation wireless communication technology (5G network) using a frequency band of an extremely high frequency (>28 GHz), which is referred to as millimeter wave (mmWave), is developing.

DISCLOSURE OF INVENTION

Technical Problem

Antenna performance may be sensitively influenced by external factors (for example, precipitation, snow, or user's body, etc.) as the frequency for wireless communication increases. For example, as the frequency for wireless communication increases, a grip sensor disposed in the proximity of an antenna may influence the radiation performance of the antenna.

Various embodiments of the disclosure provide an electronic device which can efficiently detect an exact position of a grip without having a negative effect on radiation performance of an antenna, by providing a sensing unit (for example, a sensing electrode) of a grip sensor in a communication device including the antenna.

Solution to Problem

According to various embodiments of the disclosure, an electronic device may include: a housing including a first plate, a second plate facing away from the first plate, and a side member surrounding a space between the first plate and the second plate; a printed circuit board (PCB) including a plurality of insulating layers interposed between the first plate and the second plate; an array of first conductive plates mounted in one layer of the PCB; a second conductive plate mounted in one layer of the PCB so as not to overlap the array when viewed above the second plate; a wireless communication circuit electrically connected with the array, and configured to provide wireless communication at a frequency of 20 to 100 Ghz; and a grip sensing circuit electrically connected with the second conductive plate.

Advantageous Effects of Invention

An electronic device according to various embodiments of the disclosure may include a sensing unit (for example, a sensing electrode) of a grip sensor, which is separated from a communication device, in the communication device. The sensing unit of the grip sensor may be disposed not to degrade radiation performance of a patch antenna array and a dipole antenna array included in the communication device, such that a user grip can be sensed more exactly.

According to various embodiments of the disclosure, the electronic device can identify a grip position of a user more exactly, and can efficiently manage power consumption or a beam steering time, etc. by controlling activation of at least one communication device.

BEST MODE FOR CARRYING OUT THE INVENTION

Figure 1:
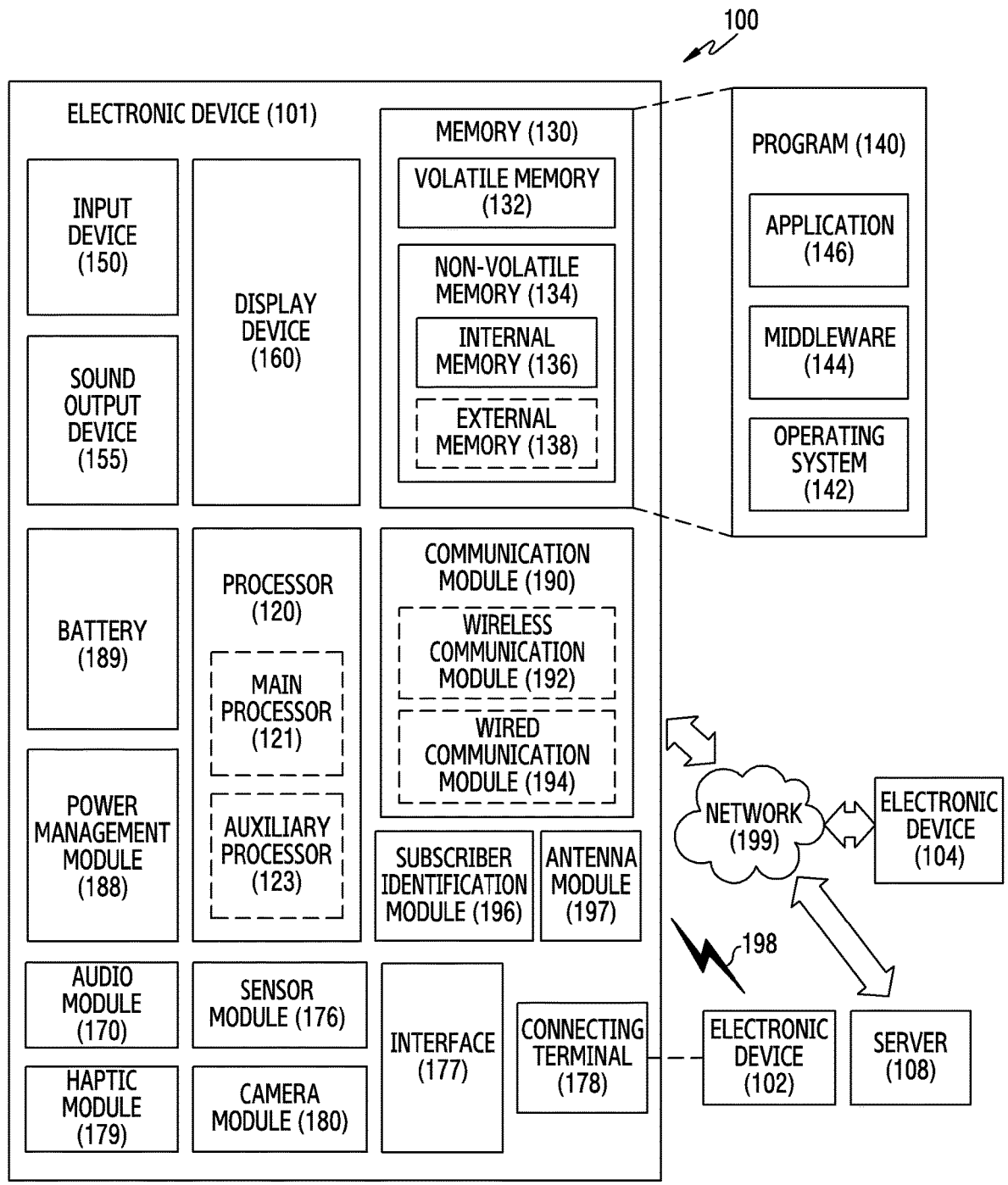
FIG. 1 is a block diagram illustrating an electronic device in a network environment according to various embodiments.

FIG. 1 is a block diagram of an electronic device in a network environment according to various embodiments of the disclosure;

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network using subscriber information stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
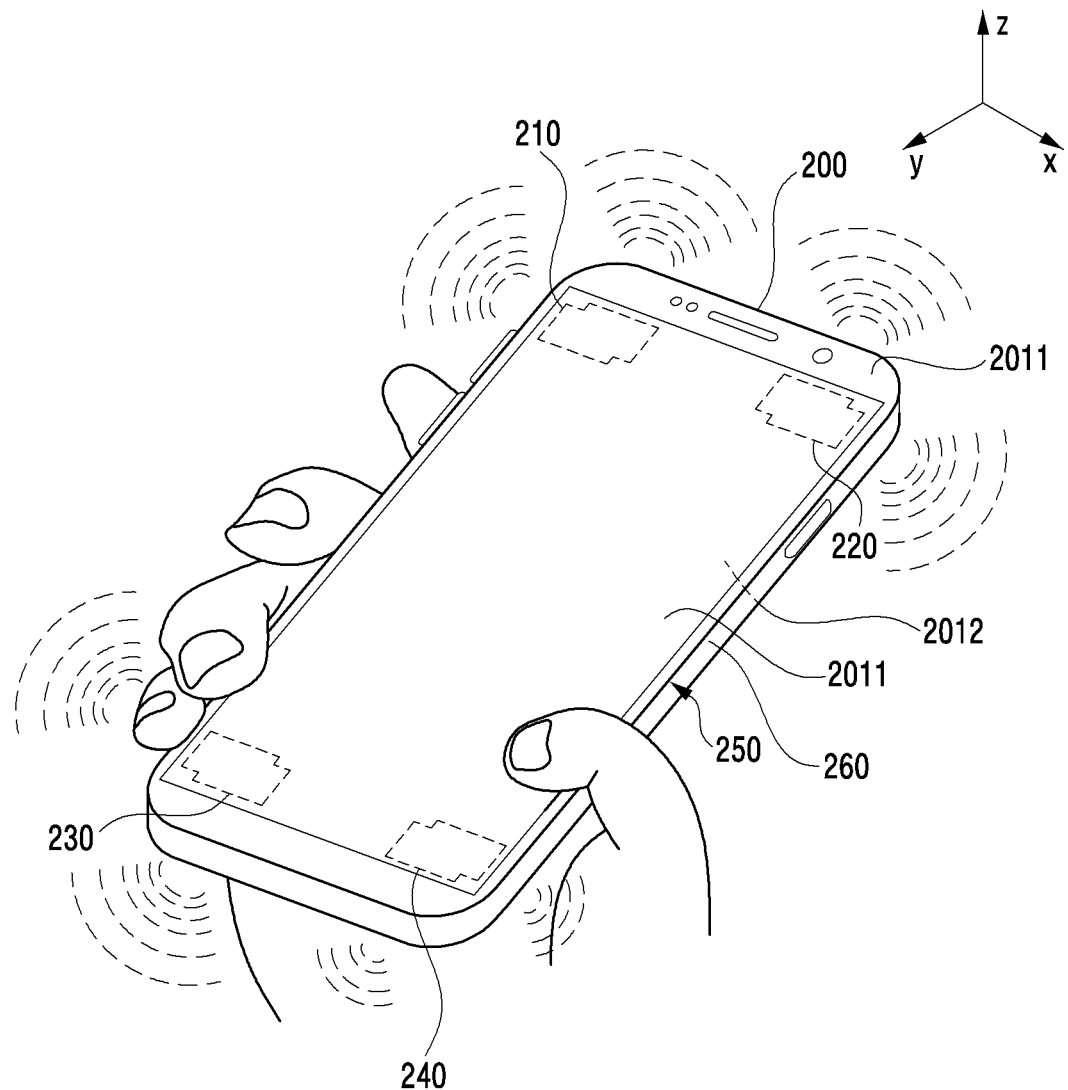
FIG. 2 is a view illustrating an exterior of an electronic device 200 according to various embodiments.

FIG. 2 is a view illustrating an exterior of an electronic device 200 according to various embodiments.

According to various embodiments, the electronic device 200 may be the electronic device 101 of FIG. 1.

Referring to FIG. 2, the electronic device 200 may include a housing 250. According to an embodiment, the housing 250 may be formed with a conductive member and/or a non-conductive member. According to an embodiment, the housing 250 may include a first surface (for example, a front surface or an upper surface) facing in a first direction (for example, a z-axis direction), a second surface disposed in a direction opposite to the first surface, and a side surface disposed to surround at least a portion of the first surface and the second surface. According to an embodiment, the side surface may be coupled with a front surface plate 2011 and a rear surface plate 2012, and may be formed by a side surface member 260. According to an embodiment, the rear surface plate 2012 may be formed with, for example, coated or colored glass, ceramic, polymer, metal (for example, aluminum, stainless steel (STS), or magnesium), or a combination of at least two of the above-mentioned materials.

According to various embodiments, the electronic device 200 may include at least one communication device which uses millimeter wave (for example, a band of 25 GHz or higher) as an operating frequency band.

According to an embodiment, the communication device (for example, a first communication device 210) may include a plurality of antenna arrays disposed on a dielectric (for example, a substrate). The antenna array may form a beam in at least one direction.

According to an embodiment, the communication device (for example, the first communication device 210) may include a communication circuit (for example, a radio frequency integrated circuit (RFIC)) which transmits and receives a wireless signal in the direction in which the beam is formed.

In an embodiment, a phase converting means (for example, a phase shifter) (not shown) may be included in the proximity of the communication circuit.

According to an embodiment, the at least one communication device 210, 220, 230, 240 may be disposed at each corner of the electronic device 200. For example, the first communication device 210 may be disposed at the left upper corner when viewed above the electronic device 200, and the second communication device 220 may be disposed at the right upper corner when viewed above the electronic device 200.

According to an embodiment, the communication device (for example, the first communication device 210) may include a sensing electrode for determining whether a user grips the electronic device. For example, the communication device may include a sensing electrode of a proximity sensor which determines proximity of the user in a capacitance method. For example, the communication device may include a sensing electrode of a proximity sensor which determines proximity of the user in a self-capacitance method.

According to an embodiment, the beam formed by the communication device (for example, the fourth communication device 240) may be easily attenuated by an external object (for example, user's palm, finger, etc.) approaching the communication device. For example, the millimeter wave, which is an operating frequency of the communication device, may have strong directionality and may be easily attenuated by an external effect. Accordingly, when the proximity of an external object (for example, user's palm or finger, etc.) is detected, the electronic device 200 may control activation of the communication device (for example, may inactivate the communication device) the radiation performance of which is degraded by the detected proximity.

Figure 3A:
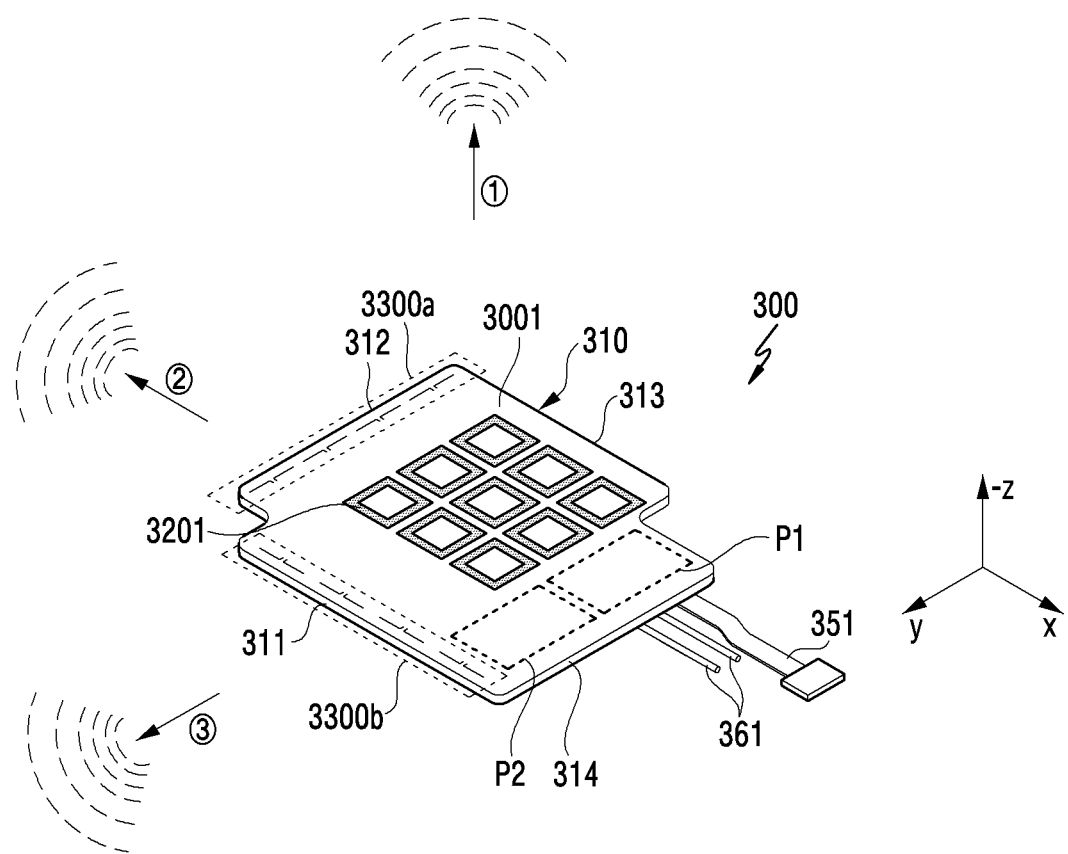
FIGS. 3A, 3B, 3C are perspective views of a communication device 300 according to various embodiments.
Figure 3B:
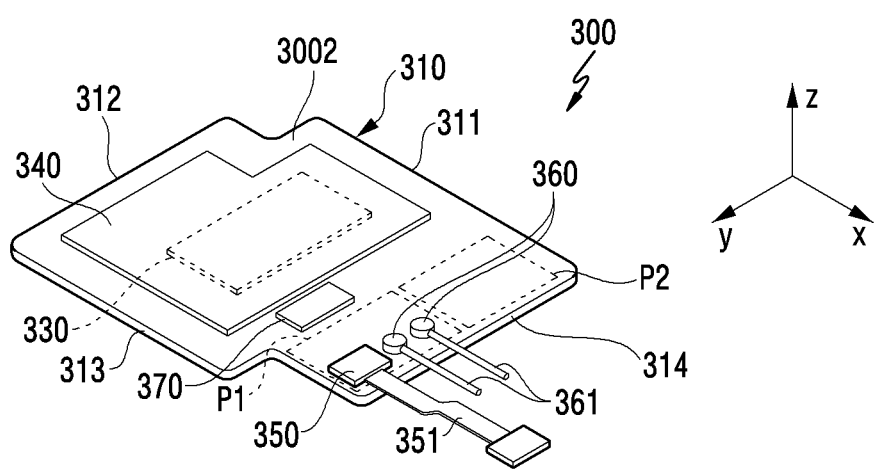
Figure 3C:
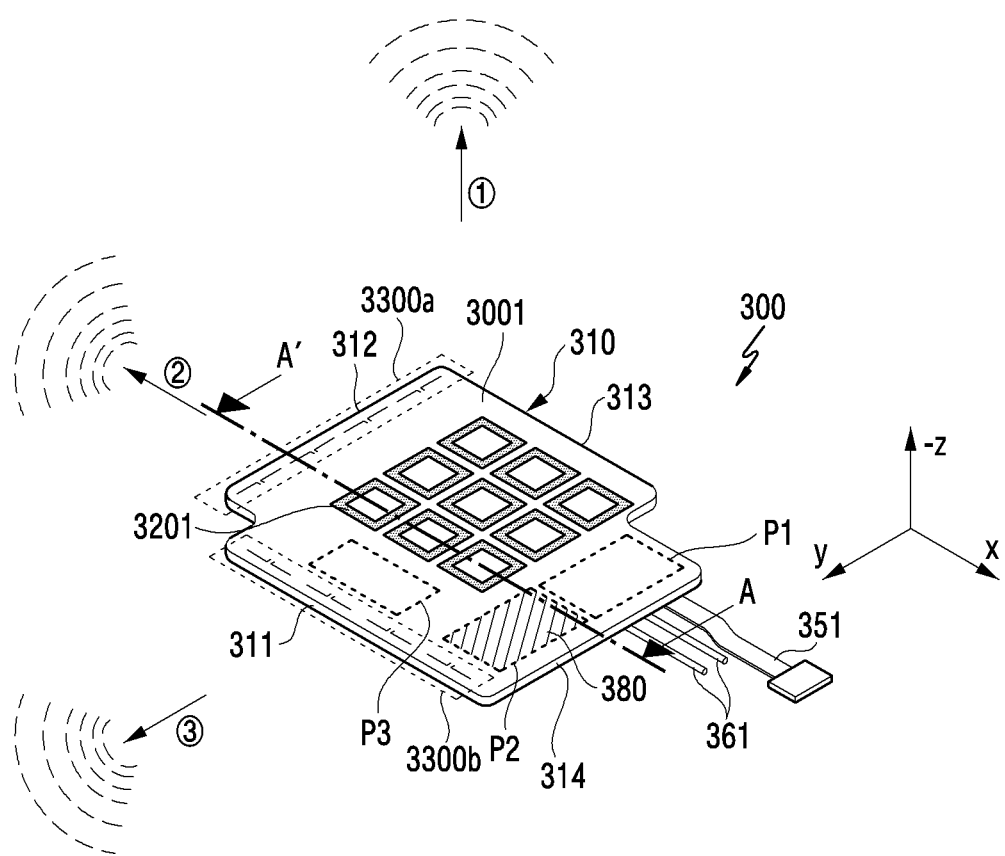

FIGS. 3A, 3B, 3C are perspective views of a communication device according to various embodiments.

The communication device 300 of FIGS. 3A, 3B may be similar to the communication device 210, 220, 230, 240 of FIG. 2 at least in part, or may include embodiments different from the communication device 210, 220, 230, 240 of FIG. 2.

Referring to FIGS. 3A and 3B, the communication device 300 may include a substrate 310 (for example, a printed circuit board). According to an embodiment, the substrate 310 may include a first surface 3001 and a second surface 3002 facing in the opposite direction of the first surface 3001. According to an embodiment, the communication device 300 may be disposed inside the electronic device to have the first surface 3001 face the rear surface plate (for example, the rear surface plate 2012 of FIG. 2) of the electronic device 200.

According to various embodiments, the substrate 310 may be formed in a substantially rectangular shape. According to an embodiment, the substrate 310 may include a first side 311, a second side 312 extended from the first side 311 in a perpendicular direction, a third side 313 extended from the second side 312 in a perpendicular direction in parallel with the first side 311, and a fourth side 314 extended from the third side 313 in a perpendicular direction in parallel with the second side 312.

According to various embodiments, the communication device 300 may include a first antenna array 3201 disposed on the first surface 3001 of the substrate 310. According to an embodiment, the first antenna array 3201 may include a patch type or pattern type conductive member forming antenna elements on the substrate 310 at regular intervals. According to an embodiment, the first antenna array 3201 may be disposed to define a beam pattern direction as being in the vicinity of a direction perpendicular to the direction of the first side 311 and the direction of the second side 312. The substrate 310 may include another antenna array facing the rear surface plate 2012.

According to various embodiments, the communication device 300 may include a second antenna array 3300a, a third antenna array 3300b disposed on the first surface 3001 of the substrate 310. In an embodiment, the second antenna array 3300a, the third antenna array 3300b may be disposed on a peripheral area of the first surface 3001 of the substrate 310. For example, the third antenna array 3300b may be disposed on a peripheral area of the first surface 3001 that faces the first side 311. The second antenna array 3300a may be disposed on a peripheral area of the first surface 3001 that faces the second side 312. According to an embodiment, beam pattern directions of the second antenna array 3300a and the third antenna array 3300b may be defined. For example, the beam pattern direction of the third antenna array 3300b disposed on the peripheral area of the first surface 3001 facing the first side 311 may be defined as the direction of the first side 311. In another example, the beam pattern direction of the second antenna array 3300a disposed on the peripheral area of the first surface 3001 facing the second side 312 may be defined as the direction of the second side 312.

According to an embodiment, the plurality of antenna elements forming one antenna array out of the second antenna array 3300a, the third antenna array 3300b may be arranged in a row according to a designated direction. For example, the antenna elements forming the second antenna array 3300a may be arranged along a virtual line which is parallel to the second side 312 and is included in the first surface 3001.

According to an embodiment, one antenna array of the second antenna array 3300a or the third antenna array 3300b may be an array of an antenna element (for example, a dipole antenna) including a conductor having a positive (+) pole and a conductor having a negative (−) pole.

According to various embodiments, the communication device 300 may include a communication circuit 330 (for example, an RFIC) disposed on the second surface 3002 of the substrate 310. According to an embodiment, the first antenna array 3201 may be electrically connected with the communication circuit 330 through a conductive via (for example, a conductive via 414a of FIG. 4) penetrating from the first surface 3001 of the substrate 310 to the second surface 3002, and a conductive path. According to an embodiment, the communication device 300 may include a shield can 340 for blocking a noise of the communication circuit 330 mounted (or disposed) on the second surface 3002 of the substrate 310. For example, the shield can 340 may be disposed on the second surface 3002 to surround the communication circuit 330.

According to an embodiment, the communication device 300 may include at least one terminal 350, 360 to be electrically connected with a printed circuit board (PCB) (for example, a main PCB) of the electronic device 200 through at least a portion of the substrate 310. According to an embodiment, the at least one terminal 350, 360 may include a power terminal 350 and/or an RF terminal 360 to be electrically connected with the PCB of the electronic device through an electrical connection member. According to an embodiment, the electrical connection member may include a flexible PCB (FPCB) 351 or a coaxial cable 361.

According to various embodiments, the communication device 300 may include a sensing circuit IC 370 mounted (or disposed) on the second surface 3002 of the substrate 310. The sensing circuit IC 370 may include a circuit for processing and treating at least a part of a signal received from a sensing electrode (for example, a sensing electrode 380 of FIG. 3C) mounted within the communication device 300. For example, the sensing circuit IC 370 may compare a value of a self-capacitance included in the signal received from the sensing electrode and a designated value. When the value of the self-capacitance is greater than the designated value, the sensing circuit IC 370 may convert the signal received from the sensing electrode into a digital signal, and may transmit the converted digital signal to a processor (for example, a processor 660a of FIG. 6).

The communication device 300 may not include the sensing circuit IC 370 due to a limited space of the substrate 310 although this is not illustrated. When the sensing circuit IC is not included in the communication device 300, the sensing circuit IC may be disposed on a separate PCB (for example, a main PCB (not shown)). For example, the sensing circuit IC disposed on the main PCB may be connected with the sensing electrode 380 of the communication device 300 through an electrical connection member (for example, an FPCB).

Referring to FIG. 3C, the communication device 300 may further include the sensing electrode 380 disposed on the substrate 310. The sensing electrode 380 may generate a signal related to a grip of a user in a designated period or aperiodically. When the user grips the electronic device 200, the sensing electrode 380 may generate a signal including information on a degree of the grip and a position of the grip. In an embodiment, the sensing electrode 380 may transmit the signal including the information on the degree of the grip and the position of the grip to a grip sensor IC (not shown) or the processor (for example, the processor 660a of FIG. 6A).

According to an embodiment, the sensing electrode 380 may include a conductive member formed on the substrate 310 in a pattern type. According to an embodiment, the sensing electrode 380 may be formed to cover the entire size of a second part P2.

According to an embodiment, the sensing electrode 380 may generate the signal including the information on the degree of the grip and the position of the grip, by detecting a sum of a capacitance value of the sensing electrode (or the pattern of the sensing electrode), and of a load capacitance value caused by an external object (for example, a finger) gripping the electronic device 200.

According to an embodiment, the sensing electrode 380 may be formed with a copper foil (Cu) having a predetermined area.

According to an embodiment, the sensing electrode 380 may be disposed in a position where the sensing electrode does not influence the performance (for example, a radiation pattern, a gain) of an antenna in the communication device 300. For example, the sensing electrode 380 may be disposed in a position where the sensing electrode does not influence the performance (for example, a radiation pattern) of the first antenna array 3201, the second antenna array 3300a, and the third antenna array 3300b. For example, the sensing electrode 380 may be disposed to avoid overlapping the radiation directions of the first antenna array 3201, the second antenna array 3300a, and the third antenna array 3300b. For example, the sensing electrode 380 may be disposed in the second part P2 on the first surface 3001 of the substrate 310. The second part P2 may be an area on the first surface 3001 close to the fourth side 314, and may be an area closer to the third side 313 than the third antenna array 3300b. The second part P2 may not overlap at least a portion of a first part P1.

According to another embodiment, the sensing electrode 380 may be disposed in a third part P3 which is an area between the first antenna array 3201 and the third antenna array 3300b.

According to an embodiment, the sensing electrode 380 may be electrically connected with the grip sensor IC 370 (not shown) (or for example, the sensing circuit IC 370 of FIG. 3B) through a conductive via penetrating from the first surface 3001 of the substrate 310 to the second surface 3002.

According to an embodiment, the sensing electrode 380 may be disposed on the second surface 3002 of the substrate 310 (not shown). For example, the sensing electrode 380 may be included in at least a portion of the shield can 340 or at least a portion of the shield can 340 may function as the sensing electrode 380.

Figure 4:
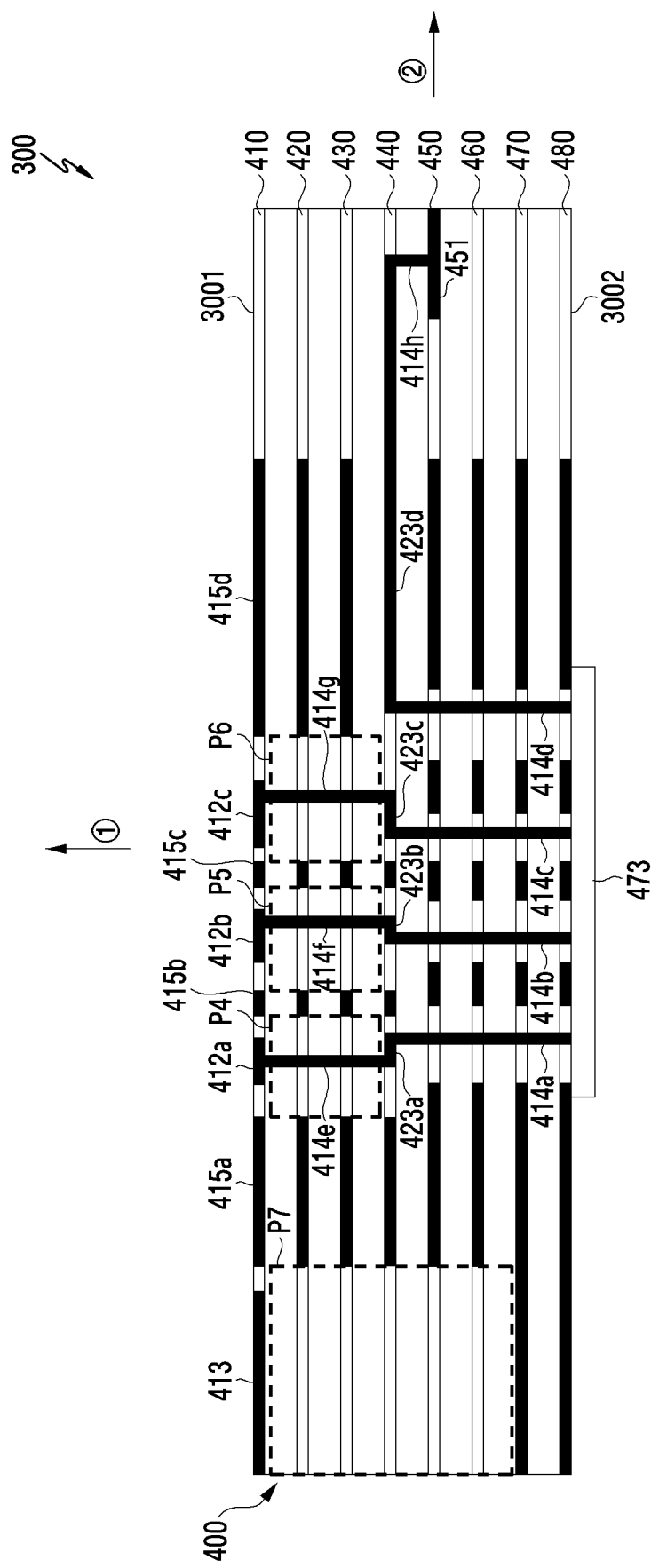
FIG. 4 is a cross-sectional view of the communication device 300 according to various embodiments of the disclosure.

FIG. 4 is a cross-sectional view of the communication device 300 according to various embodiments of the disclosure. FIG. 4 is a cross-sectional view taken on line A-A' of FIG. 3C, illustrating the communication device 300 when the sensing electrode 380 is disposed in the P2.

According to an embodiment, the communication device 300 may include a substrate 400. The substrate 400 may be the substrate 310 of FIG. 3C. The substrate 400 may include a plurality of conductive layers 410 to 480. The plurality of conductive layers 410 to 480 may be interposed between the front surface plate 2011 and the rear surface plate 2012. The number of the plurality of conductive layers 410 to 480 may be variously changed according to an embodiment, and hereinbelow, it will be illustrated that the number of the plurality of conductive layers 410 to 480 is 8, but this is just for convenience of explanation and does not limit the scope of the disclosure.

According to an embodiment, the first layer 410 may be a layer that is disposed closest to the rear surface plate 2012 from among the plurality of conductive layers 410 to 480. For example, the second layer 420 to the eighth layer 480 may be arranged in sequence from the first layer 410 in the direction from the rear surface plate 2012 to the front surface plate 2011. The eighth layer 480 may be, for example, a layer that is disclosed closest to the front surface plate 2011 from among the plurality of conductive layers 410 to 480. The substrate 400 may further include a separate layer disposed between the first layer 410 and the rear surface plate 2012 to protect the first surface 3001 although it is not illustrated. The separate layer for protecting the first surface 3001 may be a solder resist (SR) layer.

According to an embodiment, a dielectric may be interposed between two continuous layers from among the plurality of conductive layers 410 to 480. For example, the dielectric may be interposed between the first layer 410 and the second layer 420. The dielectric may serve, for example, as an insulating layer between the respective conductive layers.

According to an embodiment, the first layer 410 may have one or more first conductive members (for example, 412a, 412b, 412c, 413) disposed therein to perform a designated function. For example, the first layer 410 may have some (412a, 412b, 412c) of the antenna elements of the first antenna array 3201, and a sensing electrode 413 disposed therein.

According to an embodiment, some (412a, 412b, 412c) of the antenna elements of the first antenna array 3201 may be electrically connected with a communication circuit 473 through at least one of a conductive via (414a, 414b, 414c, 414e, 414f, 414g) penetrating from the first surface 3001 to the second surface 3002 in part, and a second conductive member 423a, 423b, 423c connecting the conductive vias.

The sensing electrode 413 may be electrically connected with a grip sensor IC (not shown) through a conductive via (not shown) penetrating from the first surface 3001 to the second surface 3002 in part, although it is not illustrated.

According to an embodiment, a portion 451 of the third antenna array 3300b may be disposed in any one of the second layer 420 to the seventh layer 470. For example, a portion 451 of the second antenna array 3300a may be disposed in the fifth layer 450, and this is just for convenience of explanation and does not limit the scope of the disclosure. The portion 451 of the second antenna array 3300a may be electrically connected with the communication circuit 473 through conductive vias 414d, 414h penetrating through one or more layers adjacent to the layer in which the portion 451 of the second antenna array 3300a is disposed, and a second conductive member 423d connecting the conductive vias. For example, when the portion 451 of the second antenna array 3300a is disposed in the fifth layer 450, the portion 451 of the second antenna array 3300a may be electrically connected with the communication circuit 473 through the conductive vias 414d, 414h penetrating through the fourth layer 440 to the eighth layer 480, and the second conductive member 423d connecting the conductive vias.

According to an embodiment, the second conductive members (for example, 415a, 415b, 415c, 415d) may be disposed in at least one layer of the first layer 410 to the eighth layer 480 to function as a ground plane for the first conductive members (for example, 412a, 412b, 412c, 451). For example, the second conductive member 415a may be interposed between the sensing electrode 413 and a portion 412a of the antenna elements of the first antenna array 3201 in the first layer 410. In another example, the second conductive member 423a may be disposed in the fourth layer 440 to connect the first conductive via 414e and the second conductive via 414a.

According to an embodiment, lengths or positions of the second conductive members functioning as a ground plane may be determined according to the first conductive members (for example, 412a, 412b, 412c, 413) disposed in the first layer 410.

For example, the second conductive members may be disposed not to be included in at least some of areas P4, P5, P6 overlapping some (412a, 412b, 412c) of the antenna elements of the first antenna array 3201 when the communication device 300 is viewed above the rear surface plate 2012. In an embodiment, the second conductive members may be removed from the areas P4, P5, P6 overlapping some 412a, 412b, 412c of the antenna elements of the first antenna array 3201.

In another example, the second conductive members may be disposed not to be included in at least a portion of the area P7 overlapping the sensing electrode 413 when the communication device 300 is viewed above the rear surface plate 2012. In an embodiment, the second conductive members may be removed from the area P7 overlapping the sensing electrode 413.

According to an embodiment, each of the areas P4, P5, P6, P7 overlapping the first conductive members may include some areas of the one or more layers. For example, at least one of the areas P4, P5, P6 may include some areas of the second layer 420, the third layer 430. In another example, the area P7 may include some areas of the second layer 420 to the sixth layer 460. In an embodiment, the number of layers that one area of the areas P4, P5, P6 includes may be the same as or different from the number of layers that the area P7 includes.

In an embodiment, one or more communication circuits 473, or the grip sensor IC (not shown) may be disposed in the eighth layer 480 to perform a designated function.

According to an embodiment, the grip sensor IC (not shown) may be electrically connected with the sensing electrode 413 via a conductive via. The grip sensor IC (not shown) may receive a signal related to a user grip from the sensing electrode 413 through the conductive via. The grip sensor IC (not shown) may transmit the signal related to the user grip to a processor (not shown) through the communication circuit 473.

According to an embodiment, the communication circuit 473 may be electrically connected with some 412a, 412b, 412c of the antenna elements of the first antenna array 3201 through at least one of the conductive vias 414a, 414b, 414c, 414e, 414f, 414g, and the second conductive members 423a, 423b, 423c connecting the conductive vias. In an embodiment, the communication circuit 473 may be electrically connected with a portion of the second antenna array 3300a through the conductive vias 414d, 414h and the second conductive member 423d connecting the conductive vias.

Figure 5A:
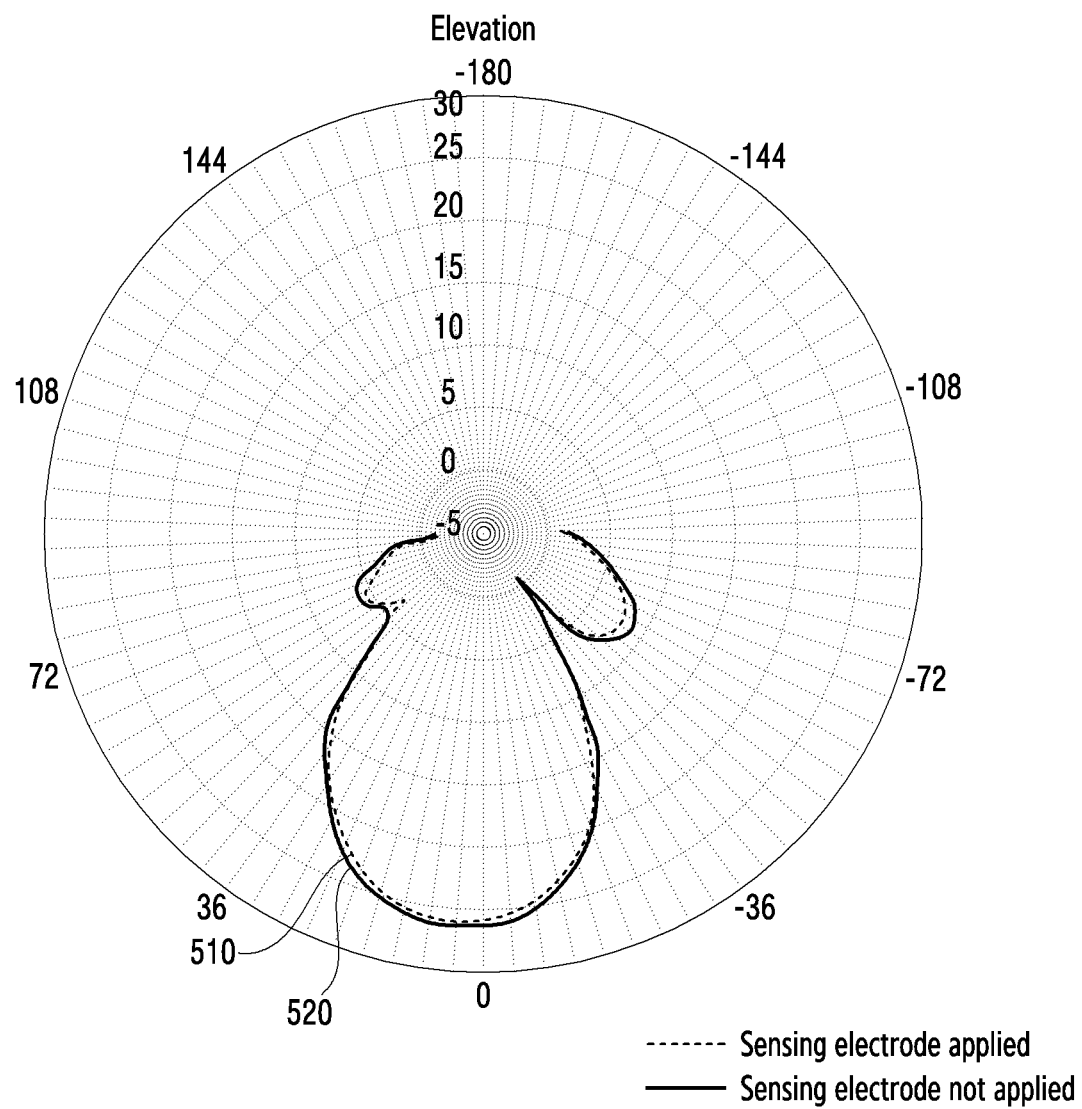
FIGS. 5A and 5B are views illustrating antenna radiation performance before and after a sensing electrode 380 is applied to the communication device 300.
Figure 5B:
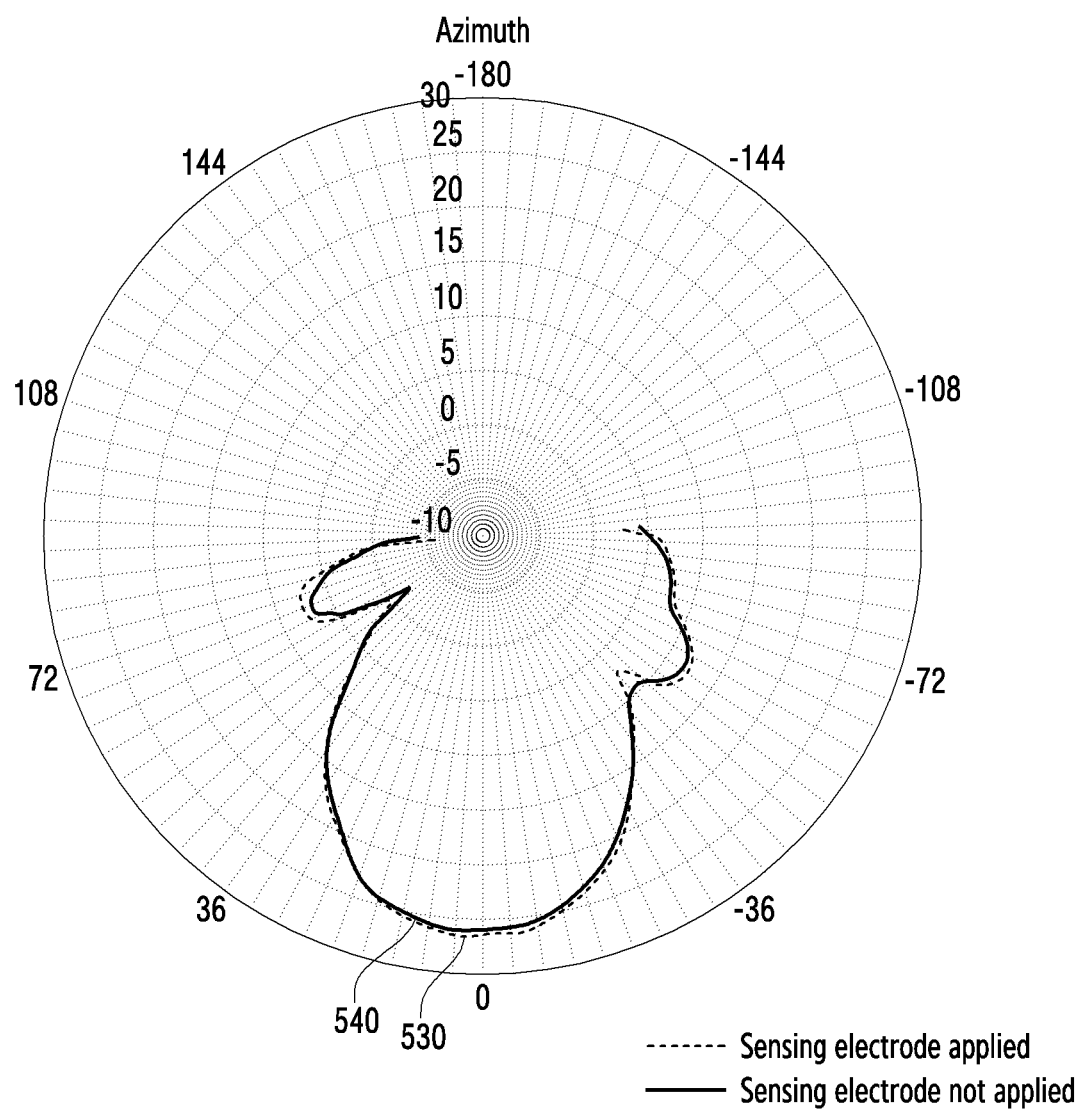

FIGS. 5A and 5B are views illustrating antenna radiation performance before and after the sensing electrode 380 is applied to a communication device (for example, the communication device 300 of FIG. 3). In an embodiment, the sensing electrode 380 being applied to the communication device 300 may refer to the sensing electrode 380 being disposed in the second part P2 or the third part P3.

FIG. 5A illustrates an elevation angle radiation pattern of a beam formed by the first antenna array 3201 before and after the sensing electrode 380 is applied to the communication device 300. A solid line 520 in FIG. 5A may indicate an elevation angle radiation pattern of a beam formed by the first antenna array 3201 before the sensing electrode 380 is applied to the communication device 300, and a dashed line 510 may indicate an elevation angle radiation pattern formed by the first antenna array 3201 after the sensing electrode 380 is applied to the communication device 300. As can be seen from FIG. 5A, there is no great difference between the elevation angle radiation patterns of the beams formed by the first antenna array 3201 before and after the sensing electrode 380 is applied to the communication device 300.

FIG. 5B illustrates an azimuth angle radiation pattern of a beam formed by the first antenna array 3201 before and after the sensing electrode 380 is applied to the communication device 300. A solid line 540 in FIG. 5B may indicate an azimuth angle radiation pattern of a beam formed by the first antenna array 3201 before the sensing electrode 380 is applied to the communication device 300, and a dashed line 530 may indicate an azimuth angle radiation pattern formed by the first antenna array 3201 after the sensing electrode 380 is applied to the communication device 300. As can be seen from FIG. 5B, there is no great difference between the azimuth angle radiation patterns of the beams formed by the first antenna array 3201 before and after the sensing electrode 380 is applied to the communication device 300.

Figure 6A:
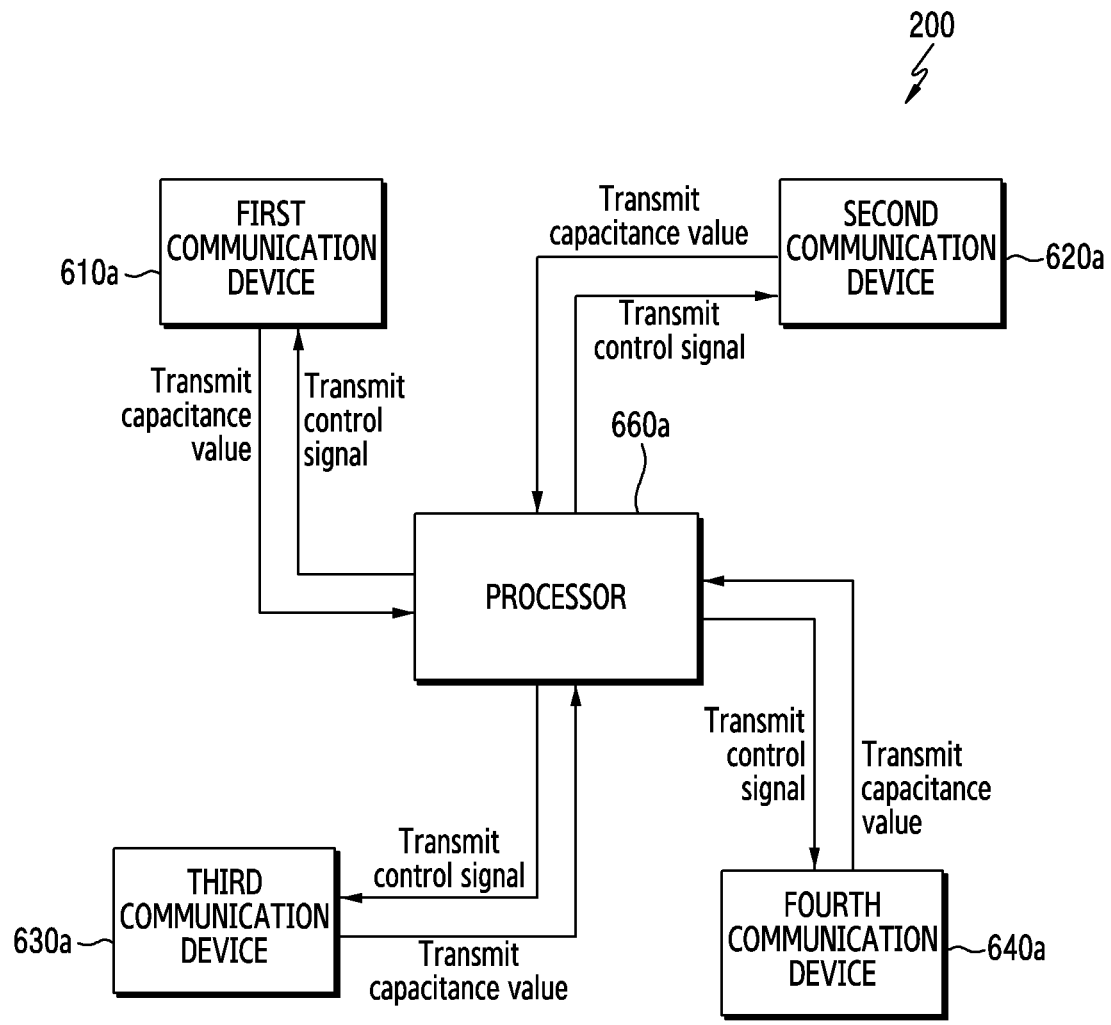
FIGS. 6A and 6B are views illustrating a flow of an electric signal within the electronic device 200.
Figure 6B:
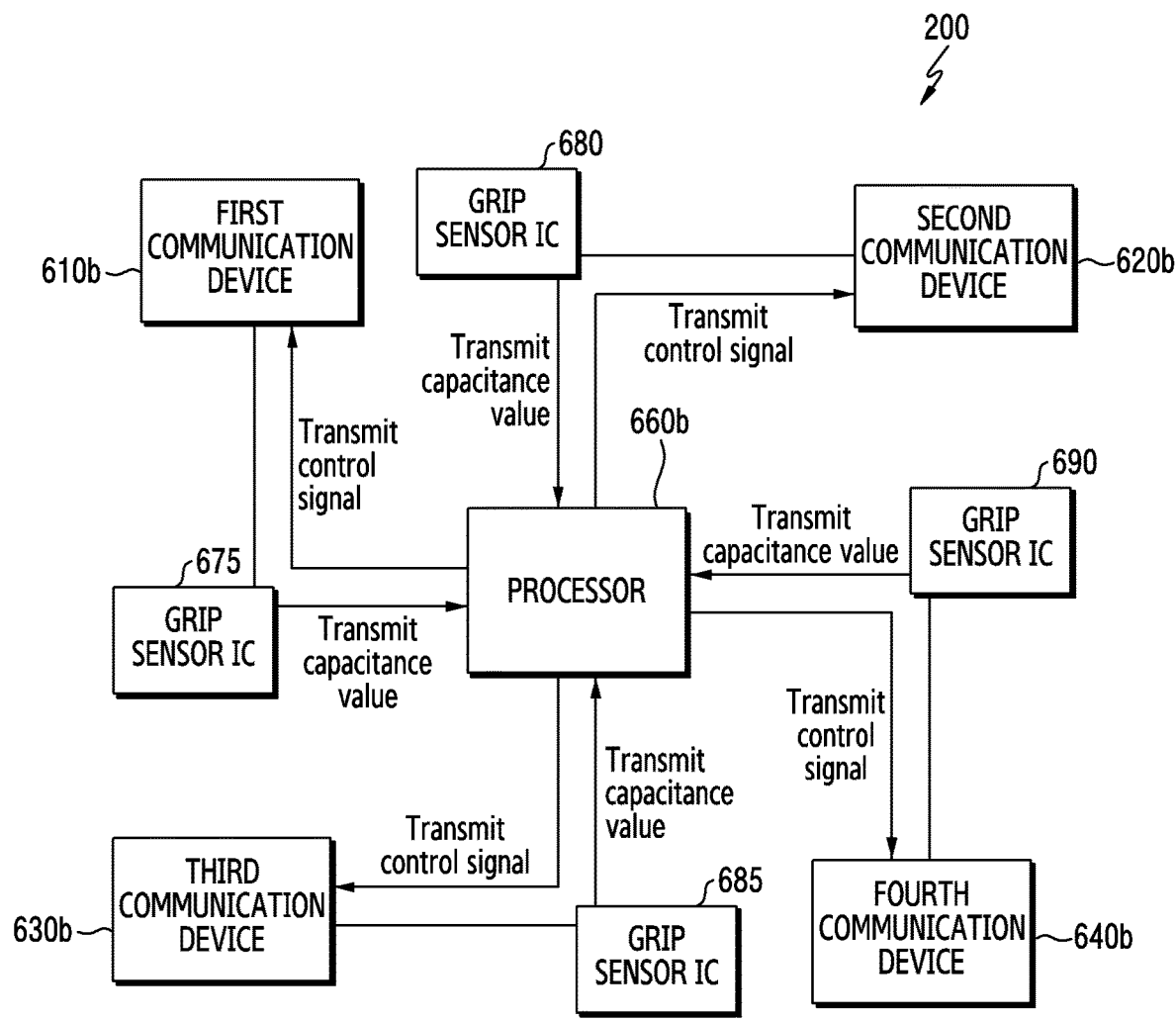

FIGS. 6A and 6B are views illustrating a flow of an electric signal within the electronic device 200.

FIG. 6A illustrates an electric signal flow when a grip sensor IC is included in a communication device (for example, a second communication device 620a), and FIG. 6B illustrates an electric signal flow when a grip sensor IC (for example, a grip sensor IC 680) is not included in the communication device (for example, a second communication device 620b).

Referring to FIG. 6A, the electronic device 200 may include at least one communication device 610a, 620a, 630a, 640a disposed at a corner of the electronic device 200, and a processor 660a electrically connected with the at least one communication device.

In an embodiment, the at least one communication device 610a, 620a, 630a, 640a may be the communication device 300.

In an embodiment, the at least one communication device 610a, 620a, 630a, 640a may transmit a signal related to a user grip to the processor 660a, and may receive a signal regarding activation of the at least one communication device 610a, 620a, 630a, 640a from the processor 660a. Hereinafter, only a flow of an electric signal between the second communication device 620a and the processor 660a will be described as a representative, and a flow of an electric signal between the other communication devices 610a, 630a, 640a and the processor 660a may be understood to those skilled in the art as a simple substitution of the configuration.

According to an embodiment, the second communication device 620a may include a sensing electrode (for example, the sensing electrode 413 of FIG. 4) and a sensing circuit IC (for example, the sensing circuit IC 370 of FIG. 3). The sensing electrode may generate a signal related to a user grip in a designated period. According to an embodiment, when the user grips the electronic device, the sensing electrode may generate a signal including information related to a degree of the grip and a position of the grip. The sensing electrode may transmit the signal related to the user grip to the sensing circuit IC.

The sensing circuit IC may divide a control signal of a dedicated interface or an RFIC by time division, and may transmit a signal including information on a self-capacitance value indicating the degree of the grip to the processor 660a.

According to an embodiment, the processor 660a may transmit a control signal regarding activation of the second communication device 620a to the second communication device 620a, based on the information on the self-capacitance received from the grip sensor IC included in the second communication device 620a. For example, when the self-capacitance value received from the grip sensor IC included in the second communication device 620 is greater than a designated value, the processor 660a may transmit a control signal for inactivating the second communication device 620a to the second communication device 620a.

According to an embodiment, the processor 660a may receive only information on a self-capacitance value satisfying a designated condition from the grip sensor IC (not shown) included in the second communication device 620a. For example, the grip sensor IC (not shown) included in the second communication device 620a may determine whether the self-capacitance value received from the sensing electrode (not shown) is greater than the designated value, and, only when the self-capacitance value is greater than the designated value, may transmit the information on the self-capacitance value to the processor 660a. According to an embodiment, the processor 660a may not compare the self-capacitance value received from the grip sensor IC (not shown) included in the second communication device 620a and the designated value, and may generate a control signal for inactivating the second communication device 620a and may transmit the control signal to the second communication device 620a. In an embodiment, the designated value may be stored in a memory (for example, the memory 130 of FIG. 1).

According to an embodiment, the processor 660a may include an application processor (AP) and a communication processor (CP), or an intermediate frequency IC (for example, an IFIC). In an embodiment, the communication processor may be interchangeably used with a modem.

In an embodiment, the signal received from the grip sensor IC may be changed to a base band frequency through the intermedia frequency IC, and may be provided to the application processor. According to an embodiment, the intermedia frequency IC may be disposed in at least a portion of a communication circuit (for example, the communication circuit 330 of FIG. 3B) of the communication device, rather than the processor 660a.

In an embodiment, the application processor may compare the self-capacitance value received from the grip sensor IC and the designated value, and, when the self-capacitance value is greater than or equal to the designated value, the application processor may generate the control signal. The application processor may control the communication processor to transmit the generated control signal.

In another embodiment, the communication processor may compare the self-capacitance value received from the grip sensor IC and the designated value, and, when the self-capacitance value is greater than or equal to the designated value, the communication processor may generate the control signal and may transmit the generated control signal to the second communication device 620a.

FIG. 6B illustrates an electric signal flow when the grip sensor IC 680 is not included in the communication device (for example, the second communication device 620b).

Referring to FIG. 6B, the second communication device 620b may transmit a signal including a value related to a user grip to the grip sensor IC 680, and may receive a control signal regarding activation of the second communication device 620b from a processor 660b. According to an embodiment, the grip sensor IC 680 may be disposed on a PCB mounted in an inner space of the electronic device 200. For example, a sensing electrode (not shown) of the second communication device 620b may generate a signal related to a user grip, and may transmit the signal related to the user grip to the grip sensor IC 680. In another example, a communication circuit (not shown) of the second communication device 620b may receive the control signal for inactivating the second communication device 620b from the processor 660b.

According to an embodiment, the processor 660b may transmit the control signal regarding activation of the second communication device 620b to the second communication device 620b, based on information on a self-capacitance received from the grip sensor IC 680. The processor 660b of FIG. 6B is similar to the processor 660a of FIG. 6A except that the signal including the self-capacitance value related to the user grip is received from the grip sensor IC 680 which is not included in the second communication device 620b, and thus a detailed description thereof is omitted.

Figure 7A:
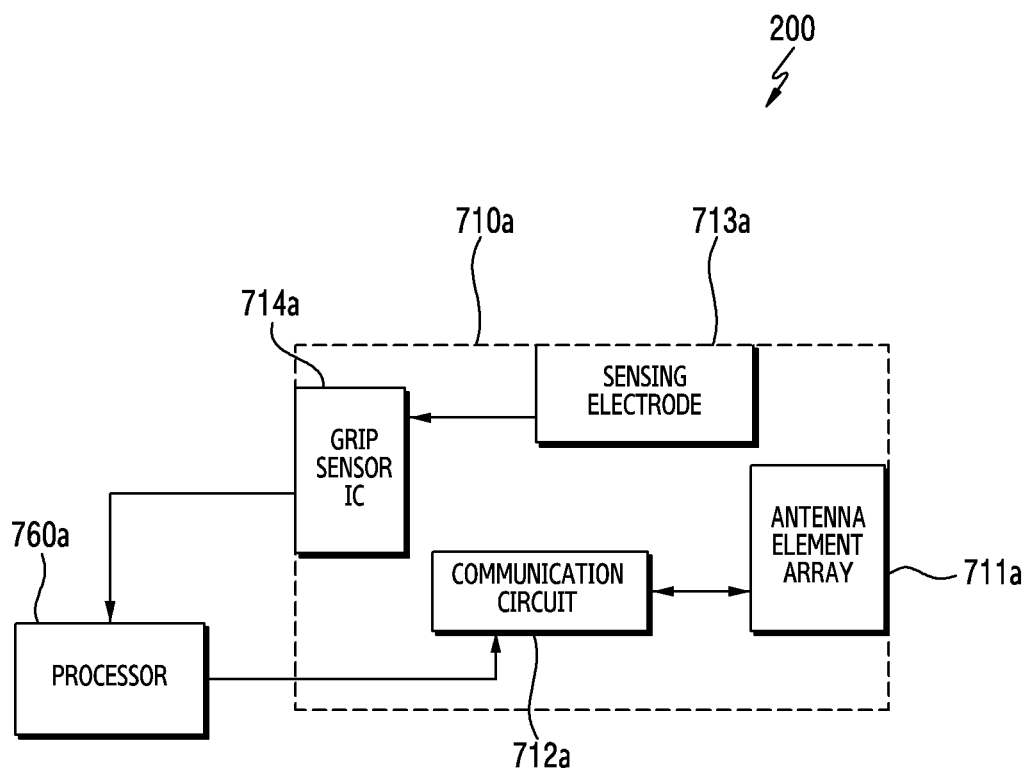
FIGS. 7A and 7B are views illustrating a flow of an electric signal within the electronic device 200.
Figure 7B:
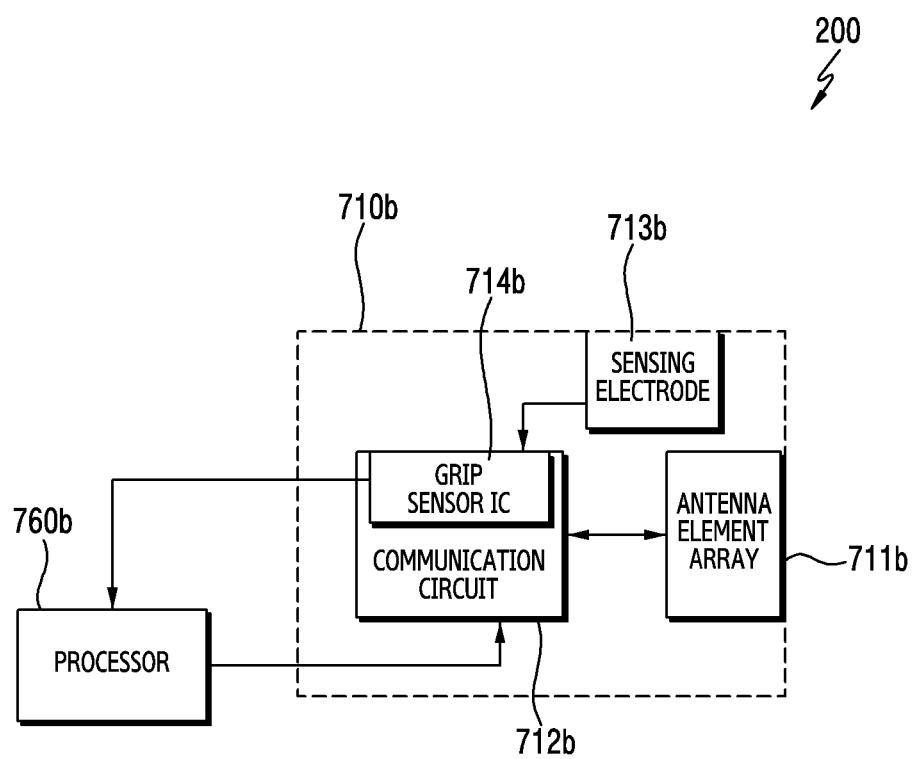

FIGS. 7A and 7B are views illustrating a flow of an electric signal within the electronic device 200.

FIGS. 7A and 7B illustrate a flow of an electric signal within the electronic device 200 when a grip sensor IC is included in at least one communication device. In an embodiment, FIG. 7A illustrates a flow of an electric signal within the electronic device 200 when the grip sensor IC 714a is not embedded in a communication circuit 712a, and FIG. 7B illustrates a flow of an electric signal within the electronic device 200 when a grip sensor IC 714b is embedded in a communication circuit 712b.

Referring to FIG. 7A, the electronic device 200 may include a processor 760a and a communication device 710a. In an embodiment, the processor 760a may be the processor 660a. In an embodiment, the communication device 710a may be the communication device 300 of FIGS. 3A, 3B, 3C.

According to an embodiment, the communication device 710a may include an antenna array 711a, a communication circuit 712a (for example, an RFIC), a sensing electrode 713a, or a grip sensor IC 714a. According to an embodiment, the antenna array 711a may include at least one of the first antenna array 3201, the second antenna array 3300a, and the third antenna array 3300b. According to an embodiment, the communication circuit 712a, the sensing electrode 713a, and the grip sensor IC 714a may correspond to the communication circuit 330, the sensing electrode 380, and the grip sensor IC 370, respectively.

In an embodiment, the antenna array 711a and the sensing electrode 713a may be disposed in one conductive layer from among a plurality of conductive layers forming the substrate 310. In an embodiment, the communication circuit 712a and the grip sensor IC 714a may be disposed in one conductive layer from among the plurality of conductive layers forming the substrate 310. The conductive layer in which the antenna array 711a and the sensing electrode 713a are disposed, and the conductive layer in which the communication circuit 712a and the grip sensor IC 714a are disposed may be the same as each other or different from each other.

According to an embodiment, the sensing electrode 713a may generate a signal including a value related to a user's grip in a designated period. When the user grips the electronic device 200, the sensing electrode 713a may generate a signal including information related to a degree of the grip and a position of the grip. For example, when the communication device 710a is the second communication device 620a, the sensing electrode 713 a may generate a signal including information indicating that the user grips a right upper corner at which the communication device 710a is disposed.

In an embodiment, the sensing electrode 713a may transmit the signal including the value related to the user's grip to the grip sensor IC 714a. For example, the sensing electrode 713a may transmit the signal including the value related to the user's grip to the grip sensor IC 714a through a conductive via (not shown).

According to an embodiment, the grip sensor IC 714a may transmit a signal related to the signal received from the sensing electrode 713a to the processor 760a. According to an embodiment, the grip sensor IC 714a may transmit the signal related to the signal received from the sensing electrode 713a to the processor 760a through at least one terminal 350, 360. For example, when a self-capacitance value received from the sensing electrode 713a is greater than or equal to a designated value, the grip sensor IC 714a may transmit a signal including the self-capacitance value to the processor 760a.

According to an embodiment, the processor 760a may include an application processor and a communication processor. In an embodiment, the application processor may control the communication processor to transmit a signal related to activation of the communication device 710a to the communication circuit 712a, based at least on the signal received from the grip sensor IC 714a. For example, the application processor which receives the self-capacitance value greater than or equal to the designated value from the grip sensor IC 714a may control the communication processor to transmit a control signal for inactivating the communication device 710a to the communication circuit 712a. In an embodiment, the control signal for inactivating the communication device 710a may be a control signal for disallowing use of the communication circuit 712a included in the communication device 710a.

Referring to FIG. 7B, the communication circuit 712b included in the communication device 710b may include the grip sensor IC 714b. For example, a sensing electrode 713b may generate a signal including a value related to a user grip in a designated period, and may transmit the generated signal to the grip sensor IC 714b included in the communication circuit 712b.

According to an embodiment, a processor 760b which transmits a signal related to activation of the communication device 710b to the communication circuit 712b, based at least on a signal received from the grip sensor IC 714b, may refer to a communication processor (not shown). For example, the communication processor may compare a self-capacitance value received from the grip sensor IC 714b and a designated value, and, when the self-capacitance value is greater than or equal to the designated value, may transmit a control signal for inactivating the communication device 710b to the communication circuit 712b. The other configuration is similar to the configuration disclosed in FIG. 7B, and thus a detailed description thereof is omitted.

Figure 8:
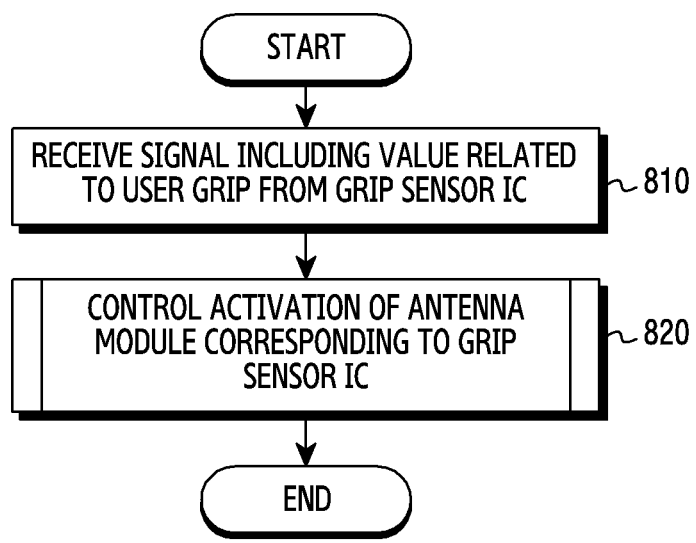
FIG. 8 is a view illustrating an operation sequence of a processor of an electronic device according to various embodiments of the disclosure.

FIG. 8 illustrates an operation flow of a processor of an electronic device according to various embodiments of the disclosure.

An entity of the operation disclosed in FIG. 8 may be the processor 760a of the electronic device 200.

In operation 810, the processor 760a may receive a signal including information on a value related to a user grip from a grip sensor IC (for example, the grip sensor IC 714a of FIG. 7A). For example, the processor 760a may receive a signal including information on a self-capacitance value greater than or equal to a designated value from the grip sensor IC 714a.

In operation 820, the processor 760a may control activation of a communication device corresponding to the grip sensor IC. The communication device corresponding to the grip sensor IC may refer to a communication device including the grip sensor IC, or a communication device including a sensing electrode transmitting a signal related to a user grip to the grip sensor IC. For example, the processor 760a may control activation of the communication device 710a including the grip sensor IC 714a. In another example, the processor 760a may transmit a control signal for inactivating the communication device 710a including the grip sensor IC 714a to the communication circuit 712a included in the communication device 710a.

In an embodiment, the control signal for inactivating the communication device 710a may be a control signal for disallowing use of the communication circuit 712a included in the communication device 710a.

Figure 9:
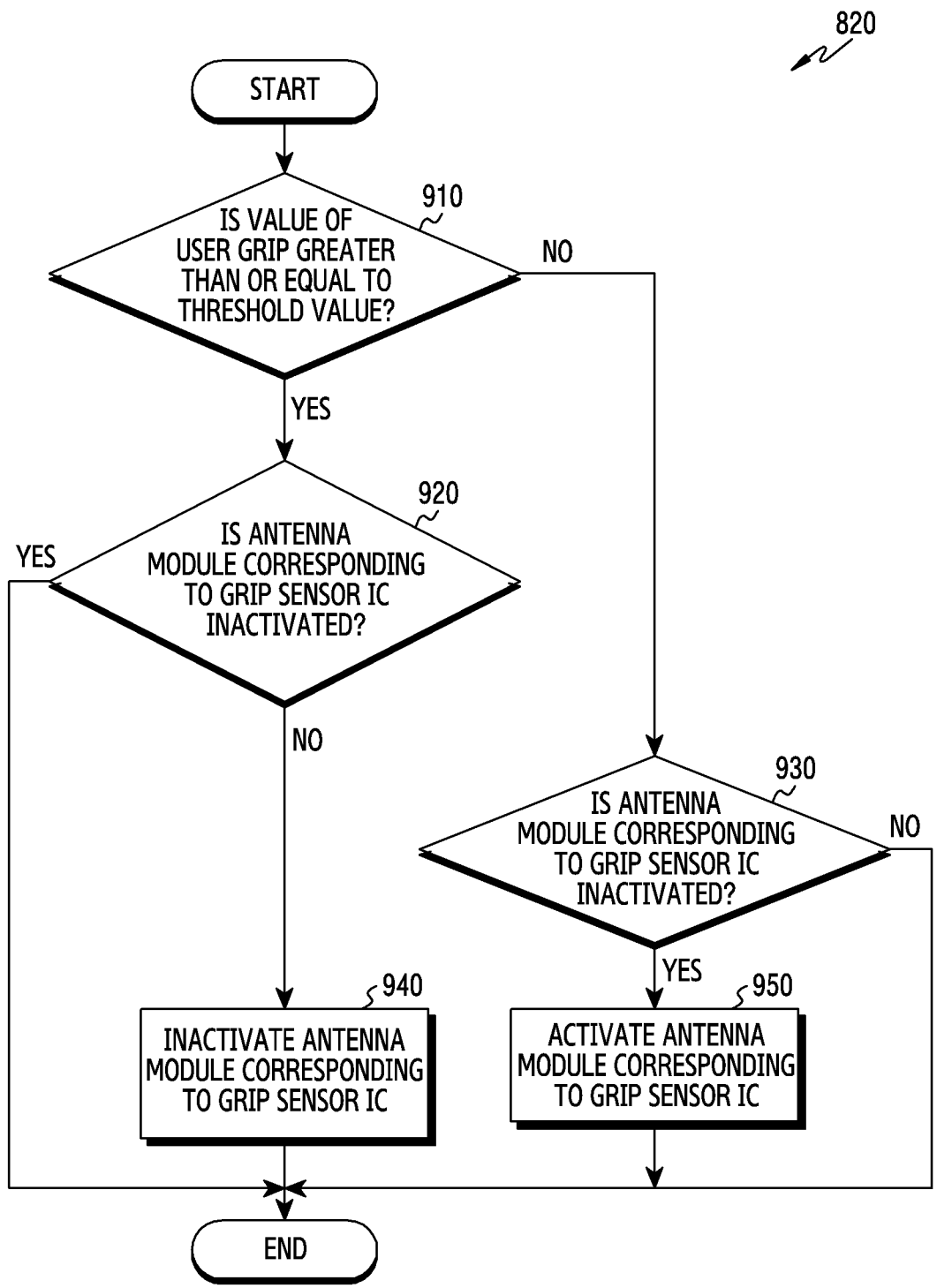
FIG. 9 is a view illustrating an operation sequence of a processor of an electronic device according to various embodiments of the disclosure.

FIG. 9 illustrates an operation flow of a processor of an electronic device according to various embodiments of the disclosure. For example, FIG. 9 may be a flowchart illustrating operation 820 of FIG. 8 in detail.

An entity of the operation disclosed in FIG. 9 may be the processor 760a of the electronic device 200.

In operation 910, the processor 760a may compare a value related to a user grip, received from the grip sensor IC, and a designated threshold value. For example, the designated threshold value may be a capacitance value which is a criterion for determining whether a user grips at least a portion of the electronic device 200. For example, the processor 760a may compare a self-capacitance value received from the grip sensor IC and the designated threshold value.

When the value related to the user grip, received from the grip sensor IC, is greater than or equal to the designated threshold value, the processor 760a may determine whether a communication device corresponding to the grip sensor IC is inactivated in operation 920. The communication device corresponding to the grip sensor IC may refer to a communication device including the grip sensor IC, or a communication device including a sensing electrode transmitting a signal related to a user grip to the grip sensor IC. For example, when the self-capacitance value received from the grip sensor IC 714a is greater than or equal to the designated threshold value, the processor 760a may determine whether the communication device 710a including the grip sensor IC 714a is inactivated.

When the communication device corresponding to the grip sensor IC is inactivated, the processor 760a may finish the algorithm disclosed in FIG. 9. In an embodiment, since the communication device corresponding to the grip sensor IC has been already inactivated, the processor 760a may not change the activation state of the communication device corresponding to the grip sensor IC and may finish the corresponding algorithm.

When the communication device corresponding to the grip sensor IC is not inactivated (is activated), the processor 760a may inactivate the communication device corresponding to the grip sensor IC in operation 940. For example, the processor 760a may transmit a control signal for disallowing use of the communication circuit included in the communication device corresponding to the grip sensor IC to the communication device.

When the value related to the user grip, received from the grip sensor IC, is less than the designated threshold value, the processor 760a may determine whether the communication device corresponding to the grip sensor IC is inactivated in operation 930.

When the communication device corresponding to the grip sensor IC is inactivated, the processor 760a may activate the communication device corresponding to the grip sensor IC in operation 950. For example, the processor 760a may transmit a control signal for allowing use of the communication circuit included in the communication device corresponding to the grip sensor IC to the communication device.

In operation 930, when the communication device corresponding to the grip sensor IC is not inactivated (is activated), the processor 760a may finish the corresponding algorithm. In an embodiment, since the communication device corresponding to the grip sensor IC has been already activated, the processor 760*a* may not change the activation state of the communication device corresponding to the grip sensor IC, and may finish the corresponding algorithm.

According to various embodiments of the disclosure, an electronic device may include: a housing including a first plate, a second plate facing away from the first plate, and a side member surrounding a space between the first plate and the second plate; a printed circuit board (PCB) including a plurality of insulating layers interposed between the first plate and the second plate; an array of first conductive plates mounted in one layer of the PCB; a second conductive plate mounted in one layer of the PCB so as not to overlap the array when viewed above the second plate; a wireless communication circuit electrically connected with the array, and configured to provide wireless communication at a frequency of 20 to 100 Ghz; and a grip sensing circuit electrically connected with the second conductive plate.

According to various embodiments, the array may be in a matrix form.

According to various embodiments, the insulating layers may include a first layer closest to the second plate, and the array and the second conductive plate may be mounted in the first layer.

According to various embodiments, the insulating layers may include a second layer closest to the first plate, and one or more third layers interposed between the first layer and the second layer, and the array may be electrically connected with the wireless communication circuit through a conductive path penetrating through the one or more third layers.

According to various embodiments, the electronic device may further include a ground plane mounted in the one or more third layers, and the ground plane may be formed by a third conductive plate having through-holes, and the through-holes may overlap the array and the second conductive plate when viewed above the second plate.

According to various embodiments, at least a portion of the communication circuit may be disposed in the second layer.

According to various embodiments, the electronic device may further include at least one array of dipole antennas protruding from at least one side surface of the PCB.

According to various embodiments, the array of the first conductive plates may be an array of patch antenna elements.

According to various embodiments, the second conductive plate may be disposed not to overlap a first direction which is formed by the patch antenna elements, and at least one second direction which is formed by the at least one array of the dipole antennas.

According to various embodiments, the second conductive plate may be interposed between the array of the first conductive plates and the at least one array of the dipole antennas.

According to various embodiments, the second conductive plate may be disposed on a side surface different from the at least one side surface from which the at least one array of the dipole antennas protrudes.

According to various embodiments, the electronic device may further include a conductive member which surrounds an upper portion of the wireless communication circuit, and is mounted in the second layer.

According to various embodiments, the conductive member may be a shield can.

According to various embodiments, the second conductive plate may include a sensing electrode for sensing information related to a grip of a user.

According to various embodiments, the grip sensing circuit may be disposed outside the PCB.

According to various embodiments, the wireless communication circuit may include the grip sensing circuit.

According to various embodiments, the grip sensing circuit may receive a signal including a value related to a user grip from the second conductive plate.

According to various embodiments, the wireless communication circuit may be configured to receive the signal including the value related to the user grip from the grip sensing circuit, and to control activation of the wireless communication circuit, based at least on the received signal.

According to various embodiments, the electronic device may further include a processor electrically connected with the grip sensing circuit and the wireless communication circuit, and disposed outside the PCB, and the processor may be configured to receive the signal including the value related to the user grip from the grip sensing circuit, and to transmit a control signal for controlling activation of the wireless communication circuit to the wireless communication circuit, based at least on the received signal.

According to various embodiments, the processor may be configured to transmit a control signal for inactivating the wireless communication circuit to the wireless communication circuit when the value related to the user grip exceeds a designated threshold value.

While specific embodiments have been described in the detailed descriptions of the disclosure, it will be understood by those skilled in the art that various changes in form and details may be made therein without departing from the spirit and scope of the disclosure as defined by the appended claims. Therefore, the scope of the disclosure is defined not by the described embodiments but by the appended claims, and all differences within the scope will be construed as being included in the disclosure.

The invention claimed is:

1. An electronic device comprising:
    a housing comprising a first plate, a second plate facing away from the first plate, and a side member surrounding a space between the first plate and the second plate;
    a printed circuit board (PCB) comprising a plurality of insulating layers and a plurality of conductive layers interposed between the first plate and the second plate;
    an array of first conductive plates mounted in a first conductive layer of the plurality of conductive layers;
    a second conductive plate mounted in the first conductive layer so as not to overlap the array when viewed above the second plate;
    a wireless communication circuit electrically connected with the array, and configured to provide wireless communication at a frequency of 20 to 100 Ghz; and
    a grip sensing circuit electrically connected with the second conductive plate.

2. The electronic device of claim 1, wherein the array is in a matrix form.

3. The electronic device of claim 2,
    wherein the first conductive layer is closest to the second plate from among the plurality of conductive layers.

4. The electronic device of claim 3,
    wherein the plurality of conductive layers comprise a second conductive layer closest to the first plate, and one or more third conductive layers interposed between the first conductive layer and the second conductive layer, and wherein the array is electrically connected with the wireless communication circuit through a conductive path penetrating through the one or more third conductive layers.

5. The electronic device of claim 4, further comprising a ground plane mounted in the one or more third conductive layers,
wherein the ground plane is formed by a third conductive plate having through-holes, and the through-holes overlap the array and the second conductive plate when viewed above the second plate.

6. The electronic device of claim 4, wherein at least a portion of the communication circuit is disposed in the second conductive layer.

7. The electronic device of claim 6, further comprising a conductive member which surrounds an upper portion of the wireless communication circuit, and is mounted in the second conductive layer.

8. The electronic device of claim 7, wherein the conductive member is a shield can.

9. The electronic device of claim 1, further comprising at least one array of dipole antennas protruding from at least one side surface of the PCB.

10. The electronic device of claim 9, wherein the array of the first conductive plates is an array of patch antenna elements.

11. The electronic device of claim 10, wherein the second conductive plate is disposed not to overlap a first direction which is formed by the patch antenna elements, and at least one second direction which is formed by the at least one array of the dipole antennas.

12. The electronic device of claim 11, wherein the second conductive plate is interposed between the array of the first conductive plates and the at least one array of the dipole antennas.

13. The electronic device of claim 11, wherein the second conductive plate is disposed on a side surface different from the at least one side surface from which the at least one array of the dipole antennas protrudes.

14. The electronic device of claim 1, wherein the second conductive plate comprises a sensing electrode for sensing information related to a grip of a user.

15. The electronic device of claim 14, wherein the grip sensing circuit is configured to receive a signal comprising a value related to a user grip from the second conductive plate.

16. The electronic device of claim 15, wherein the wireless communication circuit is configured to receive a signal comprising a value related to a user grip from the grip sensing circuit, and to control activation of the wireless communication circuit based at least on the received signal.

17. The electronic device of claim 15, further comprising a processor electrically connected with the grip sensing circuit and the wireless communication circuit, and disposed outside the PCB,
wherein the processor is configured to:
receive a signal comprising a value related to a user grip from the grip sensing circuit, and
transmit a control signal for controlling activation of the wireless communication circuit to the wireless communication circuit, based at least on the received signal.

18. The electronic device of claim 17, wherein, when the value related to the user grip exceeds a designated threshold value, the processor is configured to transmit a control signal for inactivating the wireless communication circuit to the wireless communication circuit.

19. The electronic device of claim 1, wherein the grip sensing circuit is disposed outside the PCB.

20. The electronic device of claim 1, wherein the wireless communication circuit comprises the grip sensing circuit.

* * * * *